United States Patent [19]
Kawai

[11] 3,983,971
[45] Oct. 5, 1976

[54] BRAKE DEVICE

[75] Inventor: Seiji Kawai, Tokyo, Japan

[73] Assignee: Kabushiki Kaisha Meidensha, Tokyo, Japan

[22] Filed: May 14, 1975

[21] Appl. No.: 577,788

[30] Foreign Application Priority Data
May 22, 1974 Japan.............................. 49-58258
May 22, 1974 Japan.............................. 49-58259
July 29, 1974 Japan.............................. 49-86713

[52] U.S. Cl............................. 188/171; 188/71.8; 188/72.3; 188/73.2; 192/70.14; 192/70.27; 192/90

[51] Int. Cl.²............................................ B60T 13/04

[58] Field of Search............... 188/71.8, 72.3, 216, 188/218 XL, 73.1, 73.2, 171, 173, 166, 167; 192/70.14, 70.27, 90, 101, 107 R, 111 A

[56] References Cited
UNITED STATES PATENTS

| | | |
|---|---|---|
| 1,700,860 | 2/1929 | Snell.............................. 192/70.14 |
| 2,292,704 | 8/1942 | Lillquist.............................. 188/171 |
| 3,124,219 | 3/1964 | Lee.............................. 188/72.3 X |
| 3,224,540 | 12/1965 | Straub.............................. 192/107 R |
| 3,605,958 | 9/1971 | McCarthy.............................. 188/72.3 X |
| 3,734,256 | 5/1973 | Compton et al............. 188/218 X L |

*Primary Examiner*—George E. A. Halvosa
*Attorney, Agent, or Firm*—Haseltine, Lake & Waters

[57] ABSTRACT

A brake device in which the pressure member, when braked, is urged against the brake disc by a spring and has thereon a main lining and at least one supplemental lining for friction contact with the disc brake. The supplemental lining is rotatable about its center with a disposition that one-half of the supplemental lining projects from the main lining without contacting the braking surface of the brake disc, and the other half is flush with the main lining for contact with the braking surface. A pulling member normally contacting the projecting half of the supplemental lining is provided for pulling the pressure member from the braking surface for brake release by an electromagnet.

16 Claims, 11 Drawing Figures

BRAKE DEVICE

FIELD OF THE INVENTION

This invention relates to a brake device and more particularly to an electrical brake, such as an electromagnetic brake, in which a spring is used to apply braking force to a device to be braked, and an electromagnet is used to release the brake.

THE PRIOR ART

A prior brake device of the type in which the braking force depends on a spring while the brake releasing is carried out by an electromagnet, has an inherent problem that frequent readjustments are required for compensating for widened gap between the cores due to wear of the lining. The widening of the gap width is substantial particularly in the type of brake where double brake shoes are used which operate to squeeze the brake disc therebetween in braking condition. If no readjustment is performed for compensating for an increase of the gap width due to the thickness reduction of the lining arising from friction contact, a large current flows through the coil of the electromagnet and the winding of the electrical motor being braked as well, resulting in a high possibility of burning of these windings. Such type brake device, however, is generally provided with no auto-gap adjusting mechanical structure. This necessitates a relatively large sized electromagnet to permit the performing of a complete attraction between the cores even when the gap is widened to a certain extent. Further, required are frequent checks and readjustments, if necessary, of the gap width. This results in the need of a special technique for the user.

On the other hand, in the case of a brake device with an auto-gap adjusting mechanism, such readjustment of the increased gap width is generally made in a manner that the friction disc, for example, is displaced the reduced amount of the lining thickness for compensation by adjusting the supporting point of the friction disc with screws, for example. For this purpose, screws rotatable with a relatively small torque must be used in the supporting point. Such construction poses the problem that the screws can possibly be loosened or become rusted over long time use, and superfluous parts are also needed. The latter brake device is also defective from an economical and reliability view point.

Moreover, the prior brake device suffers from another disadvantage that since the separation of the brake shoe from the brake disc is poor, abnormal wear of the brake shoe, more precisely, the lining possibly occurs upon brake releasing, particularly when the brake device is used in a vertical state. The result is that the life of brake is shortened.

SUMMARY OF THE INVENTION

Accordingly, an object of this invention is to provide a brake device in which the gap between the cores of an electromagnet may be kept constant independent of the wear of the brake shoe.

Another object of the present invention is to provide a brake device in which an abnormal wear of the brake shoe possibly occuring upon brake releasing may be eliminated.

Another object of the present invention is to provide a brake device that is relatively free from maintenance mainly of the gap readjustment.

Still another object of the present invention is to provide a brake device by which the burning of the coils of the electromagnet and of the electrical motor due to failing of brake releasing arising from poor attraction of the core is avoidable.

Another object of the present invention is to provide a brake device that is of small size, inexpensive to manufacture, and savable in electric power consumption.

In accordance with this invention, these objects are achieved by a brake device comprising: a pressure means, when braked, urged against the brake means by means of a first power source and having thereon a first friction material and at least one second friction material for friction contact with the brake means, the second friction material being rotatable about its center with a disposition that the substantial half of the second friction material projects from the first friction material without contacting the braking surface of the brake disc, while the second friction material substantially flushing with the first friction material in the faces to come in contact with the braking surface; and a pulling means normally contact the same substantial half of the second friction material for pulling the pressure means from the brake means for brake releasing by means of a second power source.

For a clearer understanding of the nature and objects of this invention will be apparent from the following description when taken in connection with the accompanying drawings, in which:

DESCRIPTION OF THE PREFERRED EMBODIMENTS

Terminology for indicating direction, relative position, or the like which will subsequently appear in this specification and is used only in connection with the views of the drawing.

Figures 1, 2, 3:
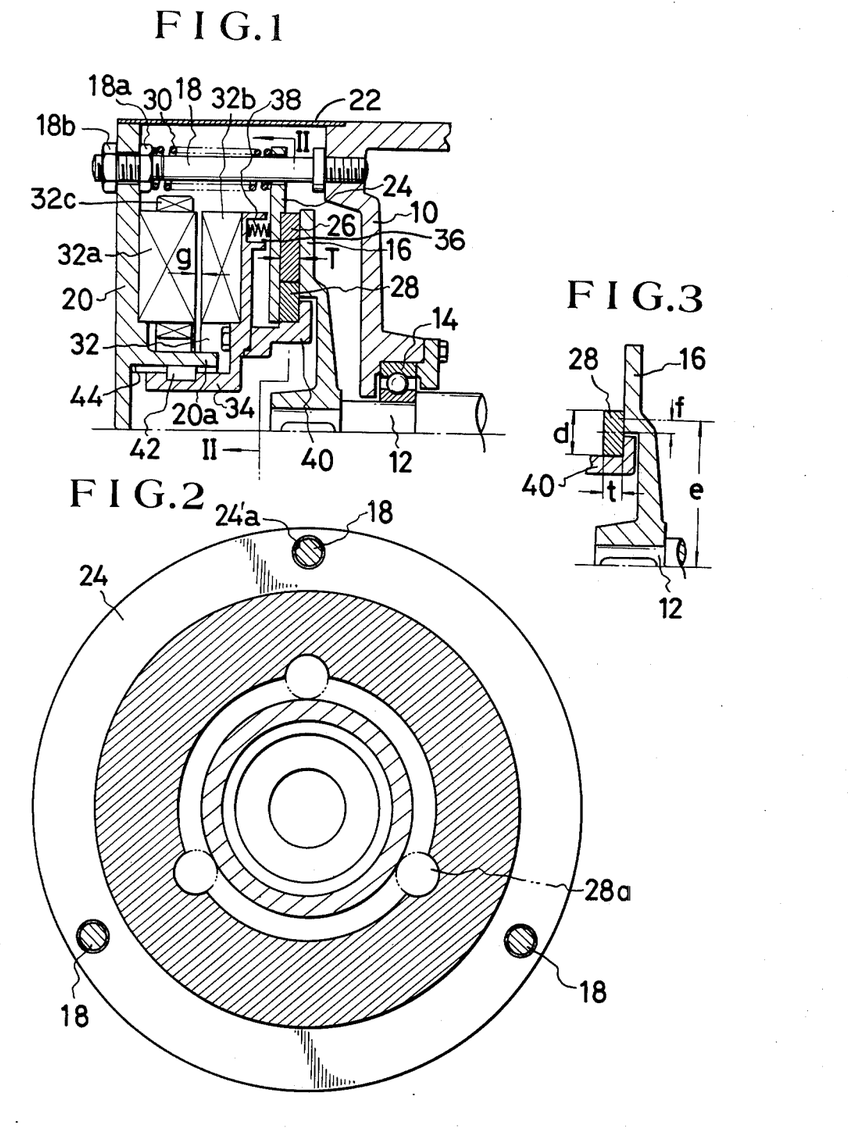
FIG. 1 is a horizontal sectional view of a part of a brake device incorporating the present invention.
FIG. 2 is a cross sectional view through the brake device, taken on the line II—II of FIG. 1.
FIG. 3 is a fragmental view for illustrating the operation of the FIG. 1 device.

Referring now to FIG. 1, there is shown a horizontal sectional view of an upper half of a brake incorporating the present invention, as will be seen from FIG. 2 taken on line II—II of FIG. 1. In the figure, a bracket 10 of an electrical motor (not shown), as an example of a power source, rotatably supports a shaft 12 of the electrical motor by a bearing 14. A brake disc 16 is fixedly coupled with one end of the shaft 12, although these members preferably are integrally formed. A guide bolt is screwed at one end into the bracket 10, while being fixed at the other end to a support member 20 by squeezing it between two nuts 18a and 18b. Reference numeral 22 designates a cover used for a conventional purpose. A lining holder 24 supported by the guide bolt 18 is slidable along the guide bolt. As seen from FIG. 2, the lining holder 24 has the shape of a ring. A main lining 26 of ring shape is secured to the surface of the lining holder 24 to which a supplemental lining 28 of disc shape also is rotatably attached adjacent lining 26. More specifically, three disc like linings 28 are equiangularly spaced about the inside of the ring-shaped lining 26. That is, three disc like linings 28 are each positioned in respective semicircles 28a formed about the inside of the ring shaped lining 26, the other half of the lining 28 projecting out of the semicircles 28a. The diameter of the disc-like lining 28, of course, is slightly smaller than that d of the semicircles 28a, so as to permit the rotation thereof. The number of disc like linings 28, is not limited to the three here employed which is used by way of example only. As will subsequently become clear, at least one supplemental lining may suffice to incorporate this invention. When an electromagnet 32 is not activated, i.e. the brake device is in a braking condition, a coiled compression spring 30 between the nut 18a and the lining holder 24 urges the lining holder 24 with the ring shaped lining 26 and one half of the disc like lining 28 against the braking surface of the brake disc. At this time, the other half of the supplemental lining 28 comes in slight contact with one end of a pulling member 40 by a compression spring 38. It is preferable that the ring-shaped lining 26 is formed to be slightly thicker than the disc like lining 28 at the initial stage, i.e. in this instance, the contact face of lining 26 is higher than the contact face of lining 28 and the linings became nearly equal in thickness as the friction progresses. In this example, the thickness of the ring like lining 26 is designated by reference charactor T and that of the disc like lining 28 by charactor t (FIGS. 1 and 3). The pulling member 40 is bolted to one leg of a L-shaped member 34 having a recess 36 which accommodates compression spring 38 one end of which contacts the lining holder 24. A moving core 32b of electromagnet 32 is secured to the opposite surface of the same leg of the L-shaped member, i.e. the surface opposite to that with the recess 36. The other leg of the L-shaped member is slidable along a cylindrical inward-facing surface of a circular shell like projection 20a integral with the support member 20. More precisely, the shell 20a is provided with at least one groove 44 extending along the shell height. A metal plate 42 planted in the L-shaped member 34 is inserted in the groove 44 to permit the member 34 to slide therealong. A core 32a with a winding 32c would therearound is attached to the inner surface of the support member 20. These cores 32a and 32b constituting the electromagnet 32 are arranged to have a gap g permitting the displacement of the pulling member 40 attached to the L-shaped member 34 for brake control. The gap width of the gap g is determined through the balance of the spring force between the coiled compression springs 30 and 38.

In a braking operation of the brake service shown in FIG. 1, the spring 30 forces the lining support member 24 with the main and supplemental linings 26 and 28 against the braking surface of the brake disc 16, so that the gap g is established between the cores 32a and 32b. The approximate half of the surface of the disc like lining 28 is in a slight contact with the pulling means 40. Strictly, the other half of the disc like lining 28 is spaced from the braking surface of the brake disc 26 by a minimal clearance amount. At the initial stage, the ring shaped lining 26 is slightly thicker than the disc like lining 28 as stated previously. Accordingly, as the friction contact of the ring like lining 26 with the braking surface progresses, the ring like lining 26 wears to be nearly equal in thickness to the disc like lining 24. Upon such reduction of the main lining thickness, the supplemental lining 28 contacts the braking surface of the brake disc 16 thereby starting to rotate with the rotation of the brake disc until the braking operation is completed. In this case, the ring lining 26 rotates with an average friction contact radius e while the disc lining 28 rotates with an average friction contact radius f (FIG. 3). Such rotation of the disc like lining 28 causes it to wear. For this reason there is ensured a relationship that these lining 26 and 28 are approximately equal in thickness, even if the wear thereof progresses. In other words, even if the main lining 26 is progressively abraded, the supplemental lining 28 may contact the braking surface of the brake on the substantial same level as the main lining 26 because the lining 28 also wears with the wear of the lining 26. In this case, the thickness reduction of these linings 26 and 28 are compensated by the corresponding expansion of the compression spring 30. The fact that both the linings 26 and 28 contact the braking surface on the same level, even if the ring lining 26 wears, is very important. The reason for this is that since such fact permits the substantial half of the disc lining 28 to contact the pulling means 40 at an approximately constant position, the gap width of the gap g may be kept approximately constant regardless of the wear of the ring lining 26 substantially performing braking action.

In a brake releasing operation, the electromagnet is energized by applying electric power thereto, and the moving core 32b moves by attraction to the other core 32a across the gap g, since the support member 20 supporting the core 32a is immovably fixed. Such movement of the core 32b pulls the pulling member 40 in the same direction which in turn separates the linings 26 and 28 attached to the lining support member 24 from the braking surface of the brake disc 16, thereby permitting a free rotation of the brake disc 16. Incidentally, a general brake device has a schematic construction such that, when the electromagnet is electrically energized, the electric power supply to the electric motor is stopped by using a circuit construction capable of performing such function. Thus, the brake device according to the present invention experiences no contact between the brake disc and the linings due to dead weight when the brake is used in a vertical state. This means that the brake device according to this invention is able to eliminate the abnormal abrasion inherently occuring in the conventional brake device. The use of material with a higher friction factor than those of the linings 26 and 28, such as stainless steel, or the like, gives little influence of its abrasion to the gap width of the gap g. The materials of the linings 26 and 28 are not necessarily identical in friction factor. It is to be further noted, here, that the shape of the supplemental lining 28 is not limited to the disc, but any shape may be permitted if it suffices the requirements of the supplemental lining that it is rotatable with the rotation of the brake disc through friction contact therebetween, and that it is substantially flush with the main lining 26 at the respective surfaces to come in contact with the braking surface of the brake disc 16, even if the main lining progressively wears, for purpose of permitting the supplemental lining to engage with the pulling means at a substantially constant position. For example, a ring would be a modification of the supplemental lining of the instance heretofore described.

Figure 4:
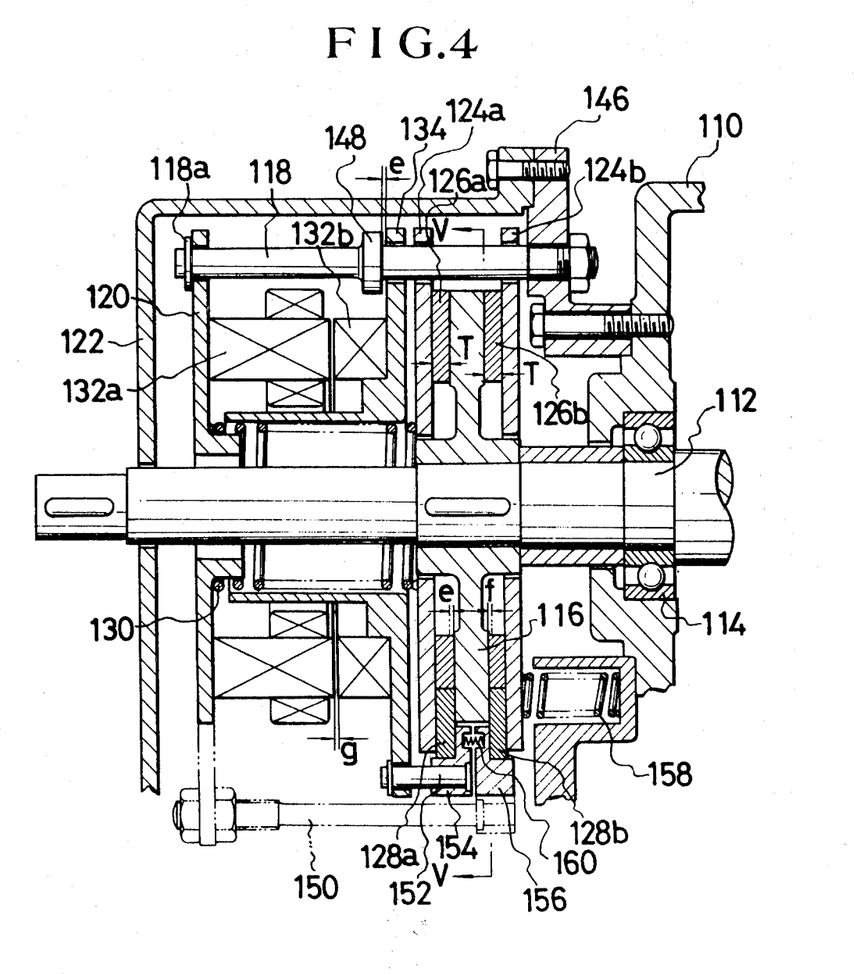
FIG. 4 is a horizontal view of another brake device embodying the present invention.

Turning now to FIG. 4, there is shown another embodiment of the present invention in which double main linings 126a and 126b are employed for braking action. As previously stated, broadening of the gap width appears in the brake device of this kind. That is, an increase of the gap width is double that in FIG. 1, because the respective surface of the two linings are abraded concurrently. The present invention has successfully solved such problem. The solution of this invention will be described hereinafter. A shaft 112 of the electrical motor or the like (not shown) is supported by a bracket 110 of the same via a bearing 114. As in the previous case, a brake disc 116 is fixedly coupled with the shaft 112. A brake support member 146 to which a cover 122 is bolted is also bolted to the upper portion of the bracket about A guide bolt 118 with a stopper 148 is bolted at one end to the brake support member 146. Although a single guide bolt 118 is illustrated in FIG. 4, three guide bolts, in effect, are used, as viewed in FIG. 5 where three holes 124'a to receive the respective guide bolts are illustrated arranged about the periphery of a first pressure member 124a. The FIG. 1 embodiment is the same in this respect. A first core support member 134, a first pressure member 124a and a second pressure member 124b are slidably supported by the guide bolt on the right hand side with respect to the stopper 148 thereof. At the leftmost end of the guide bolt 118 is slidably disposed a second core support member 120. It is to be noted that the first and the second core support members, and pressure members 134, 120, 124a and 124b are all of roundish shape with a hole in the center permitting passage of the shaft 112 therethrough, as seen from FIGS. 4 and 5.

Figures 5, 6:
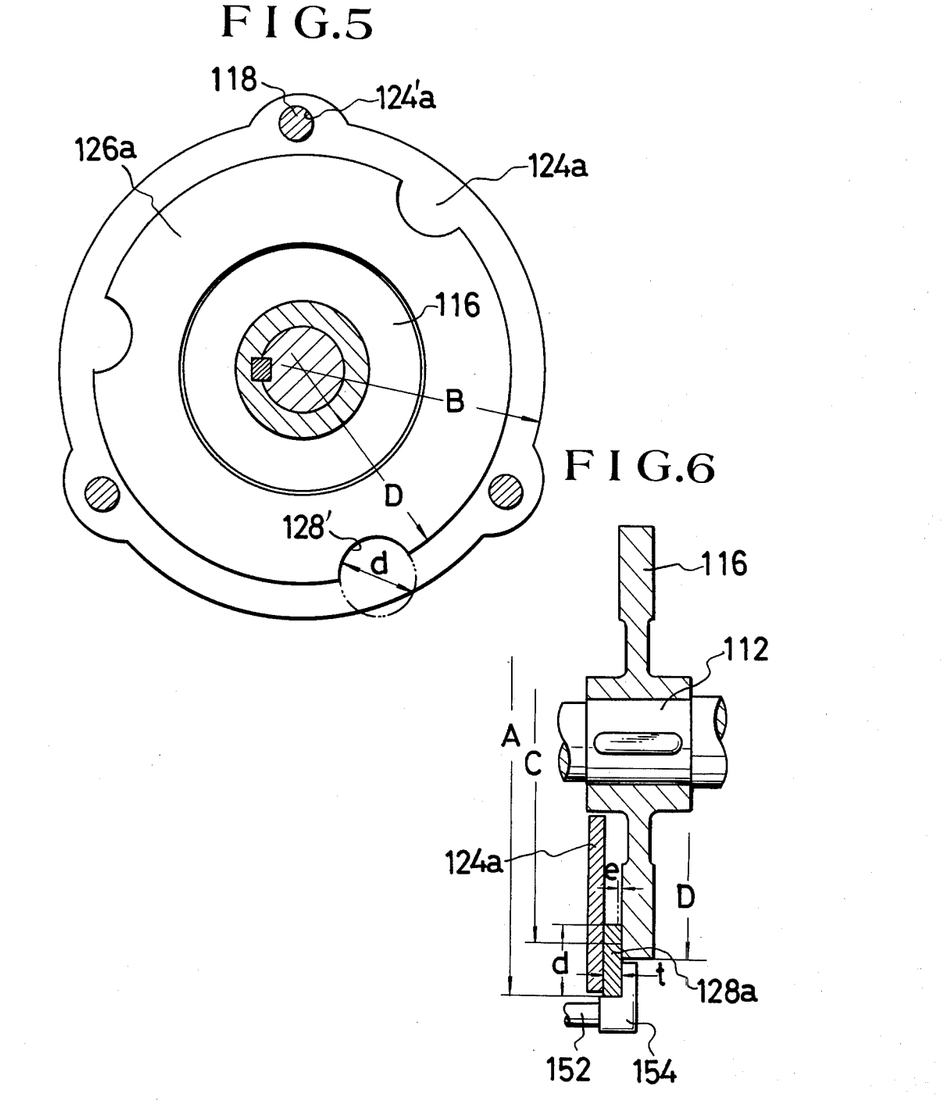
FIG. 5 is a cross sectional view through the brake device, taken on line V—V of FIG. 4.
FIG. 6 is a fragmental view for illustrating the operation of the FIG. 4 device.

The first pressure member 124a is provided on one surface with the main lining 126a and three disc like supplemental linings 128a. The disc like linings 128a each are rotatably disposed in respective semicricles 128' formed around the periphery of the main lining 126a. Each of the supplemental linings 128a projects substantially halfway from the semicircle 128' and beyond the top end of the brake disc. As in the previous case, the main brake lining 126a is formed, at the initial stage, to be slightly thicker than the supplemental brake lining 128a, and, with progression of friction contact, these linings become substantially equal in thickness. Such construction of the first pressure member 124a is the same as that of the second pressure member 124b. Accordingly, no description will be made bout the second pressure member 124b.

A coiled compression spring 130 is fitted between the second core support member 120 and the first pressure member 124a, surrounding the shaft 112. In a braking operation for the brake device shown in FIG. 4, this spring 130 presses the first pressure member 126a against the braking surface of the brake disc 116 through the main lining 126a and one-half the supplemental brake linings 128a. The core support member 120 is also urged against another collar like stopper 118a at the leftmost end of the guide bolt 118, by the spring 130. Urging of the second pressure member 124b against the other braking surface through the main lining 126b and the halves of the supplemental linings 128b is effected by another compression spring 158. The first core support member having movable cores 132b mounted thereon as shown in the figure is coupled with a pulling member 154 by means of a suitable coupling means 152, for example, a bolt. At this time, the L-shaped surface of the pulling member 154 is just fitted to the projecting half of the supplemental lining 128a with a slight contact. For this, the first core support member 134 is positioned at the place where a clearance e exists between the stopper 148 of the guide bolt 118 and the core support member 134 while at the same time the core 132b is disposed relative to a core 132a with a gap g whose width is about twice that of the gap e. In FIG. 4 of the drawing, reference character e also indicates the gap between the stopper 148 and the core support member 134, and that between the brake disc 116 and the lining 126a, both gaps being taken equal to each other for simplification of explanation. The core 132a with a winding therearound is fixed to the second core support member 120, confronting the moving core 132b. At this state of braking, the projecting half of the supplemental disc like lining 128b likewise contacts slightly the L-shaped surface of a pushing member 156 which is coupled with the second core support member 120 now being pressed against the stopper at the leftmost end of the guide bolt 118, through a long bolt 150. A small compression spring 160 is located between the pulling and the pushing members 154 and 156, being received in the space defined between the respective recesses of those members. The construction of this brake device and its braking operation are as described above.

In a brake releasing operation, the electromagnet comprising the cores 132a and 132b and the winding for the core 132a is electrically energized. Upon this energization, the moving core 132b first moves toward the another core 132a, dragging the first core support member 134. This movement continues until the first core support member 134 is stopped by the stopper 148 after moving the distance of the gap e. As a result, the main and the supplemental lining 126a and 126b of the first pressure member 124a are separated from the braking surface by the clearance corresponding to the gap e, since the pulling member 154 pulls the supplemental lining 128a out of contact. Then, the core 132a moves toward the core 132b, together with the second core support member 120 and the pushing means 154, until it is brought into contact with the core 132b. By this movement, the main and the supplemental linings 126b and 128b of the second pressure member 124b are separated from the braking surface the brake disc by the clearance of f. It will be seen from the figure that the displacement of the core 132b is made against the spring force of the spring 130 alone, while that of the core 132a against the springs 130 and 158. It is for this reason that the displacement of the core 132b is first carried out. It is to be noted here that these displacements of the cores, in fact, are made instantaneously.

Returning to the braking operation of this brake device, explanation is made for showing why the gap width g between cores may be maintained constant regardless of the wear of the main linings 126a and 126b. At the initial stage, the disk like supplemental linings 128a and 128b are slightly thinner than the main linings 126a and 126b, respectively. With repeated braking action, the thickness T of the main linings becomes substantially equal to t of the supplemental linings. As a result, the supplemental linings come in contact with the corresponding braking surfaces of the brake disk 116, and thus the individual supplemental linings start to rotate as a friction wheel with the result that the surfaces of friction contact thereof are uniformly abraded. Therefore, the pulling and the pushing members 154 and 156 are permitted to come in contact with the corresponding supplemental linings at a predetermined constant level, even when the main linings are abraded. It is evident that this is applicable for the case of FIG. 1.

The thickness reduction of the brake disc due to wear may be negligible or has little influence on widening of the gap width, if it is made of material, such as stainless steel, with a friction factor preferably much higher than that of the friction material of lining, although that of latter has also a high wear resistance. The construction of the brake device according to this invention, further, produces little influence of the brake disc thickness reduction on the gap width. That is, although the wear of the brake disc contributes to widen the gap width, the contact area between the supplemental lining and the braking surface is small and the amount of wear thereat is little, and the thickness reduction of such lining conversely contributes to lessen the gap width.

Figure 7:
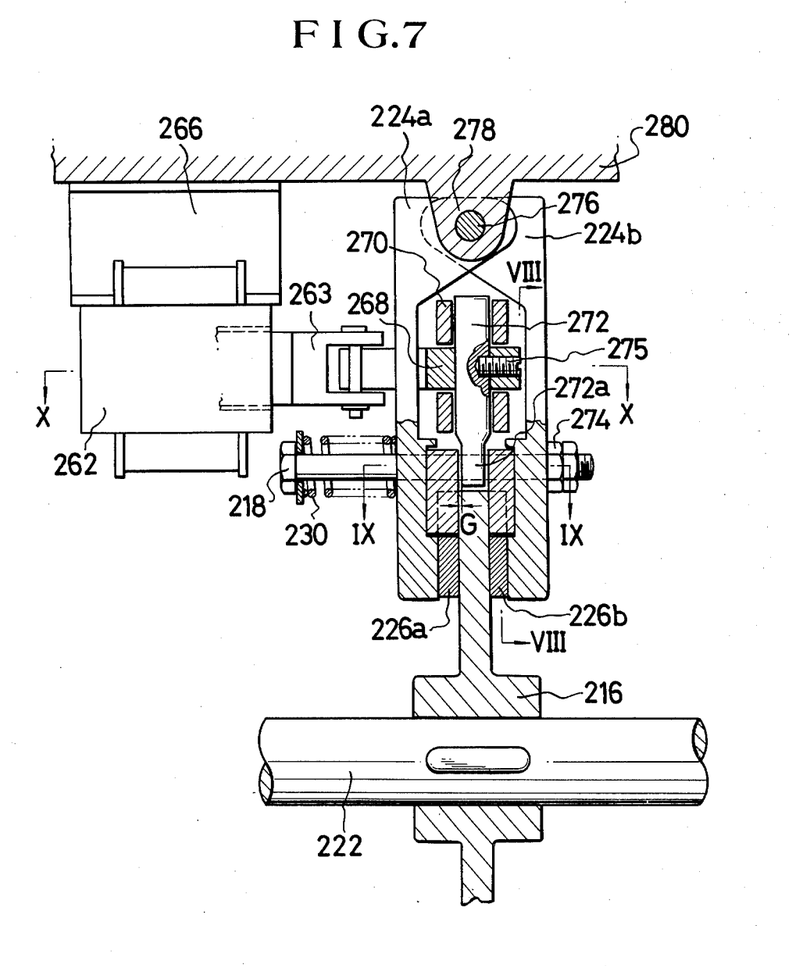
FIG. 7 is a longitudinal sectional view of still another brake device embodying the present invention.
Figure 8:
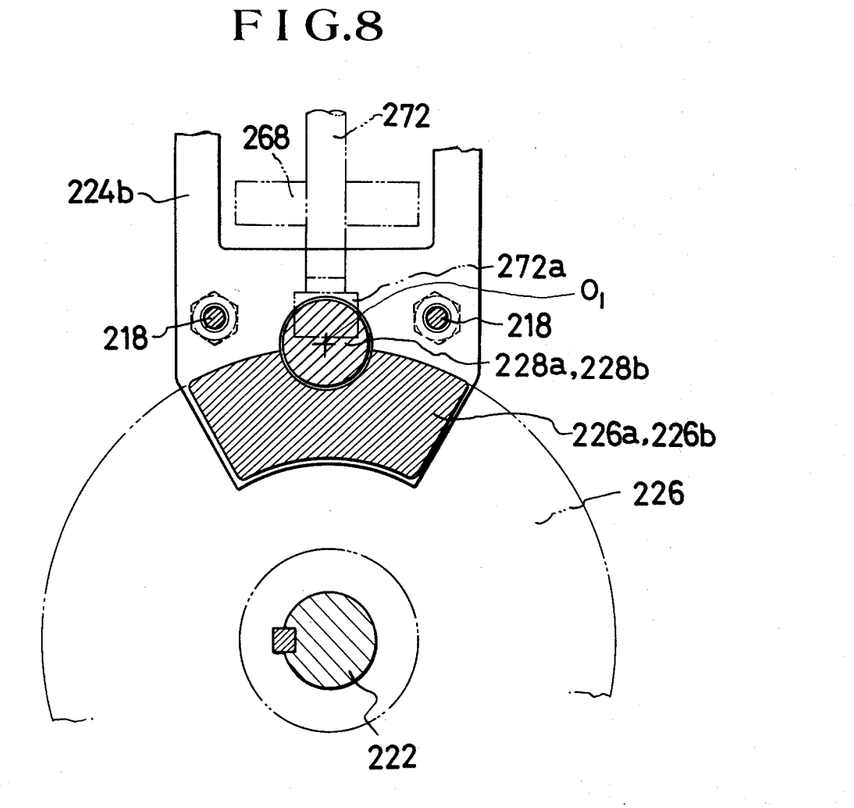
FIG. 8 is a sectional view through the brake device, taken on line VIII—VIII of FIG. 7.

Reference is made to FIG. 7 illustrating another embodiment of the present invention. In the figure, a brake disc 216 is fixed to a shaft 222 coupled to the prime mover for example, an electrical car, thereby permitting both of them to rotate as a body. A pair of pressure levers 224a and 224b are hinged about a pin 276 to a bracket 278 of a housing 280. Main brake linings 226a and 226b are provided on the inner surfaces of the pressure lever 224a and 224b, respectively. These main brake linings 226a and 226b are brought into contact with the corresponding surfaces of the brake disk 216 for the purpose of a braking operation. Relatively long bolts 218 loosely pass through the pressure levers 224a and 224b (FIGS. 7 and 8). A coiled compression spring 230 is fitted between the collar head of the bolt 218. The compression spring 230, in cooperation with a nut 274, acts to squeeze the disc brake 216 between the pressure levers 224a and 224b for a braking operation.

Figures 9, 10A, 10B:
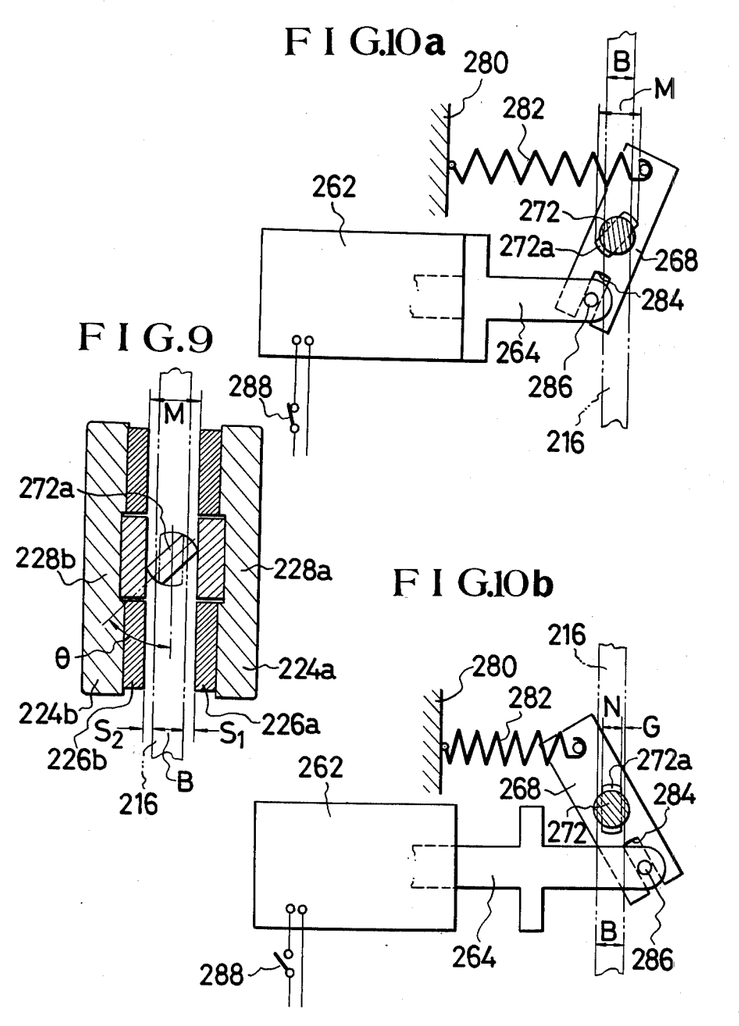
FIG. 9 is a cross sectional view through the brake device, taken on line IX—IX of FIG. 7.
FIGS. 10a and 10b are cross sectional views through the brake device, taken on line X—X of FIG. 7.

A cam shaft 272 rotatably supported by a support member 270 integral with the housing 280 is disposed in the space defined by the symmetrical recessed portions of the respective pressure levers 224a and 224b. The lower end 272a of the cam shaft 272 serves as a cam and is shaped to have a pair of parallel level surfaces, as shown in FIGS. 7 and 9. A crank lever 268 is fixed to the upper end of the cam shaft 272a by means of a set screw 275. The crank lever 268 is provided at one end with a slot 284 to slidably receive a pin 286 of a moving core 264 of an electromagnet solenoid 262 fixed to another bracket 266 of the housing 280, as shown in FIGS. 10a and 10b. An expansion spring 282 has its both ends hooked to the other end of the crank 268 and to the housing 280 and the spring is expanded in a braking operation, as shown in FIG. 10a.

Turning to FIG. 8, the main brake linings 226a and 226b have the form of a fan. Each of the main brake linings 226a and 226b is provided with a semicircular concave recess. Disc like supplemental brake linings 228a and 228b rotatably fixed to the pressure levers 224a and 224b are rotatably received in the repective semicircular recess. As in the previous cases, the disc like supplemental linings are substantially flush with the corresponding main lining at the faces to be pressed against the brake disk 216, and the center $o_1$ of the disc like lining lies on the periphery of the brake disc 216. In other words, substantially one-half of the disc like lining projects from the main lining without contacting it.

In the operation of braking, the solenoid 262 is not in operation with the moving core 286 fully extended, as shown in FIG. 10b. At the same time, the spring 282 fully pulls the crank 268. This causes the cam shaft to rotate such that the parallel surfaces of the cam 272a at the lower end of the cam shaft are aligned parallel to the supplemental brake linings 226a and 226b with gaps G between each cam surface and the corresponding supplemental brake lining. Assuming now that the width of the cam is N, and the distance between the supplemental brake linings 226a and 226b is B. These are related by the equation $B-N \approx G/2$. Under this condition, the spring 230 directly urges the pressure lever 224a to the right while at the same time the bolt 218 reacts to press the pressure lever 224b to the left. Therefore, those forces are vertically applied to the contact surfaces between the linings and the brake disc, thereby stopping the rotation of the disc brake. It is apparent that the braking force may be varied through adjustment of the nut 274.

In a brake releasing operation, a power switch 288 is first closed for energizing the solenoid 262. The energized solenoid 262 pulls the moving core 264 with a force exceeding the spring force. This causes the cam shaft 272 to rotate clockwise, as shown in FIG. 10a. At the same time, the cam 272a also rotates to produce a cam lift M proportional to the rotating angle $\theta$ (M > B). Such rotation of the cam 272a forcibly expands the distance B between the supplemental brake linings to form clearances $S_1$ and $S_2$ on both sides of the brake disc 216, thus resulting in brake releasing. That is, the equation $M-B = (S_1 + S_2)$ holds.

In this example, the spring 230 used must have a spring force sufficient to give a desired braking force. The requirement for the spring 282 is that it has a spring force sufficient to draw out the moving core 13 by overcoming the sliding friction of the cam 272a and the moving core 264, but much smaller than the electromagnetic force of the solenoid 262.

Thus, the respective supplemental brake linings 228a and 228b are brought into contact with the brake disc, substantially flush with the corresponding main brake lining 224a and 224b, while one half of the supplemental brake lining alone comes into contact with the brake disc. By this contact of the supplemental brake lining, it rotates with the brake disc to be uniformly abraded. Accordingly, the supplemental brake lining is flush with the main brake lining, even if wear of the latter progresses. The result is that the width of the gap G is maintained constant regardless of the brake lining.

Many modifications may be made in the specific structure of the brake device of this invention without departing from the appended claims.

What is claimed is:

1. A brake device having a brake disc connected for rotation with a shaft, said device comprising: a pressure means for being urged against the brake disc during a braking operation, a first power source for operating the pressure means, said pressure means comprising a first body of friction material, having a surface for frictional contact with the brake disc, at least one second body of friction material having a surface for frictional contact with said brake disc, said second body of friction material being rotatable about a center and disposed such that substantially only one-half of said second body of friction material contacts said brake disc, said friction surfaces of said first and second bodies for contact with the brake disc being substantially flush with one another; pulling means normally contacting the other half of said second body of friction material for pulling said pressure means away from the brake disc in a brake release operation and a second power source including a fixed part and a movable part acting on said pulling means to pull the pressure means away from the brake disc.

2. A brake device according to claim 1, in which said pulling means has one end fixedly coupled with said movable part of said second power source and a second end with a face contacting said other half of said second body of friction material for brake release when said second power source is activated.

3. A brake device according to claim 1, in which said second power source is an electromagnet and said movable part is a movable core.

4. A brake device according to claim 1, in which said body of second friction material has a disc shape.

5. A brake device having a brake disc connected for rotation with a shaft, said device comprising: a pressure means for being urged against the brake disc during a braking operation, a spring acting on said pressure means urging the same against the brake disc, said pressure means including a first brake lining having a surface for frictional contact with the brake disc, at least one second brake lining of disc shape having a surface for frictional contact with said brake disc, said second brake lining being rotatable about a center with a disposition such that only substantially one-half of said second brake lining contacts said brake disc, respective surfaces of said first and second brake linings which are to be pressed against said brake disc for frictional contact, being substantially flush with one another; and pulling means for pulling the pressure means away from the brake disc during a brake release operation, an electromagnet having a core coupled to said pulling means, said pulling means normally contacting slightly the other half of said second brake lining for applying pressure thereto during brake release when said electromagnet is activated.

6. A brake device according to claim 5, in which said brake disc is made of a material having a friction factor higher than those of said first and second brake linings.

7. A brake device having a brake disc connected to a shaft and comprising: first and second pressure means both disposed to normally squeeze said brake disc therebetween, a first power source for actuating said first and second pressure means, each pressure means including a body of a first friction material with a surface for frictional contact with the brake disc, at least one second body of friction material with a surface for frictional contact with said brake disc, said body of second friction material being rotatable about a center with a disposition that substantially only one-half of said second body friction material contacts said brake disc and is substantially flush with said body of said first friction material at the respective surfaces to be pressed against the corresponding surface of said brake disc; first and second pulling means for pulling said first and second pressure means for brake release from the corresponding surfaces of said brake disc, a second power source for activating said first and second pulling means, said second power source including first and second parts, said first pulling means being fixedly coupled with one part of said second power source and normally contacting slightly the other half of said second body of friction material of said first pressure means, said second pulling means being fixedly coupled with the other part of said second power source while normally contacting slightly the other half of said second body of friction material of said second pressure means.

8. A brake device according to claim 7, in which said first power source comprises a first spring acting to urge said first pressure means against one surface of said brake disc and a second spring acting to urge said second pressure means against the reverse surface of said brake disc.

9. A brake device according to claim 8, in which said second power source comprises at least one electromagnet having a movable core which is fixedly coupled with said first pulling means, a core with a winding therearound fixedly coupled with said second pulling means, said first spring being fitted between said second pulling means and said first pressure means.

10. A brake device according to claim 9 comprising a stopper, pulling means normally being separated from said stopper with a first gap, said first and second cores facing each other with a second gap the width of which is twice that of said first gap, said electromagnet when activated causing said first pulling means with said mavable core to move against said stopper, and then said core with the winding moves by attraction to said movable core opposing said first spring force thereby contacting said movable core.

11. A brake device according to claim 9, in which said body of second friction material has a disc shape.

12. A brake device having a brake disc connected to a shaft comprising:
 first and second pressure means both disposed with the brake disc therebetween, a first power source for acting on said first and second pressure means to press the same against the disc, each pressure means including a first body of friction material with a surface for frictional contact with the brake disc, and at least one second body of friction material having a surface for frictional contact with said brake disc, said second body of friction material being rotatable about a center with a disposition that only substantially one-half of said second body of friction material contacts said brake disc, and is substantially flush with said first body of friction material at respective surfaces of said first and second bodies of friction material to be pressed against the corresponding surface of said brake disc; and a cam means for separating said first and second pressure means from the brake disc disposed between halves of said second bodies of friction material of said first and second pressure means; and a second power source for driving said cam means.

13. A brake according to claim 12, in which said first power source comprises a spring disposed to normally urge said first and second pressure means against said brake disc.

14. A brake according to claim 12 wherein said cam means comprises a cam shaft, said second power source comprising a solenoid having a movable core coupled with said cam shaft for rotation thereof.

15. A brake according to claim 12 in which said second bodies of friction material each has a disc shape.

16. A brake according to claim 12 in which said first bodies of friction material each has a fan shape.

* * * * *